United States Patent [19]

Nielsen

[11] 4,122,617

[45] * Oct. 31, 1978

[54] PICTURE FRAME

[76] Inventor: Helmar Nielsen, 365 Main St., Townsend, Mass. 01469

[*] Notice: The portion of the term of this patent subsequent to Jun. 28, 1993, has been disclaimed.

[21] Appl. No.: 699,267

[22] Filed: Jun. 24, 1976

Related U.S. Application Data

[60] Division of Ser. No. 496,746, Aug. 12, 1974, Pat. No. 3,965,601, which is a continuation of Ser. No. 422,900, Dec. 12, 1973, abandoned, which is a continuation-in-part of Ser. No. 217,915, Jan. 14, 1972, abandoned.

[51] Int. Cl.² .............................................. G09F 1/12
[52] U.S. Cl. ...................................... 40/155; 403/401
[58] Field of Search ................... 40/152, 155; 403/401, 403/402

[56] References Cited

U.S. PATENT DOCUMENTS

| | | | |
|---|---|---|---|
| 2,581,843 | 1/1952 | Edwards | 40/155 |
| 2,654,451 | 10/1953 | Schmidgall | 40/152 X |
| 3,534,490 | 10/1970 | Herbert | 40/155 |
| 3,698,114 | 10/1972 | Hirsch | 40/155 |
| 3,965,601 | 6/1976 | Nielsen | 40/155 |

Primary Examiner—Louis G. Mancene
Assistant Examiner—Wenceslao J. Contreras
Attorney, Agent, or Firm—John E. Toupal

[57] ABSTRACT

A quick-assembly picture frame is provided with improved means for locking the precut frame members together. The invention is intended for use primarily with picture frames formed from metal in extruded cross sectional shapes. Adjacent ends of frame members which define the corners of the frame are locked together by L-shaped brackets which are received in channels at the rear face of each of the frame members. The L-shaped brackets at each corner are secured to the channels by any suitable means such as screws which bear inwardly toward the bottom of the channels to secure the L-shaped brackets in the channels. The L-shaped brackets and channels are formed in a manner which, when the screws are tightened, will cause adjacent frame members to pivot slightly about their lengths and in a manner which draws the forwardly facing corner regions of the frame sections tightly together.

15 Claims, 11 Drawing Figures

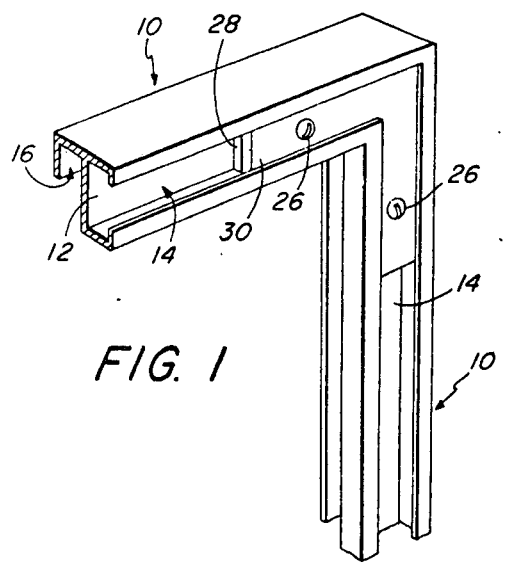
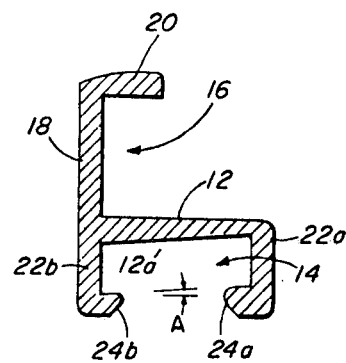
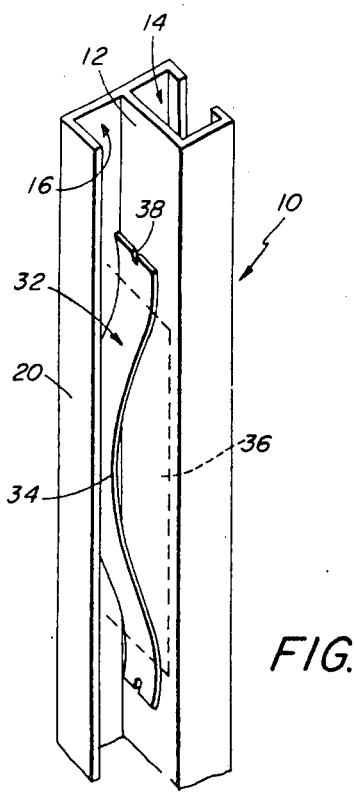
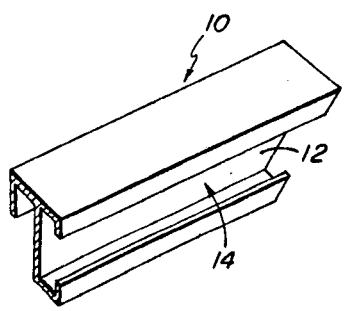
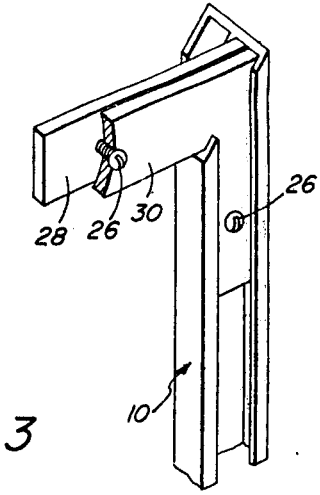
FIG. 1
FIG. 2
FIG. 3
FIG. 4

PICTURE FRAME

CROSS-REFERENCE TO RELATED APPLICATIONS

This invention is a division of U.S. application Ser. No. 496,746, filed Aug. 12, 1974, now U.S. Pat. No. 3,965,601, which application was a continuation of application Ser. No. 422,900, filed Dec. 12, 1973, and now abandoned, which in turn was a continuation-in-part of application Ser. No. 217,915, filed Jan. 14, 1972 and now abandoned.

BACKGROUND OF THE INVENTION

In recent years there have been a number of commercially available picture frames and frame sections formed from extruded metal such as aluminum. These picture frames often are available in unassembled kit form. The most common technique for assembling the picture frame sections into the complete frame includes the provision of channels on the rear surface of the frame sections, with the channels of adjacent sections in the corners of the frame meeting in L-shaped configuration. Typically, the adjacent ends of the frame sections have been assembled, to form a corner of the frame, by placing an L-shaped bracket at each corner of the frame so that each leg of the bracket extends into the channel of one of the adjacent frame sections. Each of the bracket legs is secured to its associated framing section by suitable locking means, usually a screw which is threaded through the leg of the bracket and which is urged firmly against the rearwardly facing, inner surface of the channel formed on the rear surface of each framing member.

While the foregoing technique has been used widely, it does have some disadvantages. For example, the joint at the adjacent ends of the frame sections tend to loosen with time. This may be the result of the relatively soft character of aluminum which is used typically for the extruded frame sections. Additionally, because frames of the type described may be assembled and disassembled with relative ease, these frames often are used repeatedly to frame a number of different pictures. Because the screws which ordinarily bear firmly against the rearwardly facing surface of the aluminum channel tend to mar the channel and form depressions in the channel, the surface of the channel becomes irregular which reduces the effective holding power of the screws. This aggravates the inherent difficulty of typical prior devices which, even when unmarred by repetitive tightening of the screws, tends to make a poor and sometimes loose joint at the corners where the adjacent frame sections meet. It is among the primary objects of the invention to provide an improved arrangement for securing the adjacent ends of the frame sections together which avoids the foregoing difficulties.

SUMMARY OF THE INVENTION

In brief, the invention includes the forming of the L-shaped bracket in cooperation with the configuration of the channel which receives the bracket so that when the fastening means, such as the screws of the bracket are tightened, the frame sections will pivot along their longitudinal axes relative to the engaged bracket legs to cause the beveled corners of the frame sections to be urged snugly against each other, thus enhancing the front appearance of the frame by avoiding gaps at the corners and also providing a tighter fit. In one embodiment of the invention this is achieved by forming selected surfaces of the channel at a slight bevel. In another embodiment of the invention the L-shaped brackets have a beveled and/or wedge shaped cross-section which cooperate with the channel configuration to achieve the desired effect.

It is among the objects of the invention to provide an improved arrangement for locking the adjacent ends of preformed frame sections together.

Another object of the invention is to provide an improved framing arrangement which insures that beveled mating ends of frame sections will fit snugly adjacent each other and avoid unsightly gaps or cracks.

DESCRIPTION OF THE DRAWINGS

The foregoing and other objects and advantages of the invention will be understood more fully from the following detailed description thereof with reference to the accompanying drawings wherein:

FIG. 1 is an illustration of a corner of the frame assembled in accordance with the invention and seen from the rear of the frame;

FIG. 2 is a cross-sectional illustration of the frame section;

FIG. 3 is an illustration of a pair of adjacent frame sections in readiness to be assembled;

FIG. 4 is an illustration of an improved clip adapted to maintain the framed picture fully forward within the frame;

DESCRIPTION OF THE PREFERRED EMBODIMENT

Figure 6:
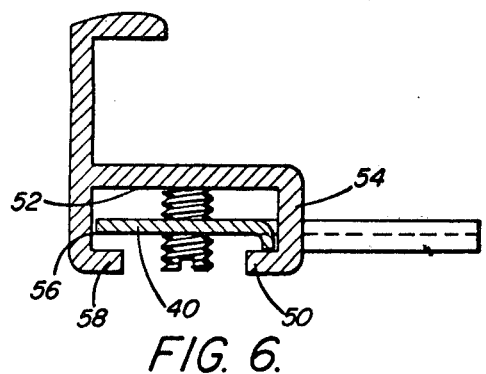
FIGS. 6 and 6A are illustrations of the bracket shown in FIG. 5 and illustrating the manner in which it causes the frame sections to twist or cant.

FIG. 1 shows a typical corner junction of the frame as viewed from the rear of the frame. The frame is constructed from a plurality of frame sections 10 which preferably are formed from an extruded material such as aluminum or the like. Each of the frame sections is of substantially identical cross-sectional configuration having a central web 12 which is common to a rearwardly opening channel 14 and a picture and glass receiving channel 16 disposed on the forward side of the frame members. The forward picture receiving channel 16 comprises an upper portion 18 and a lip 20 which extends inwardly of the completed frame. The rearwardly facing channel 14 includes a pair of rearwardly extending walls 22a, 22b which terminate in inwardly extending lips 24a and 24b.

This general arrangement has been employed typically in frames of the type described. The ends of the frame sections have been joined typically by providing a single L-shaped bracket, as suggested in the drawings, which is received snugly in the adjacent rearwardly facing channels 14 of the adjacent frame sections. The frame sections 10 are secured together by one or more set screws 26 which are threaded through each leg of the L-shaped bracket and bear firmly against the inner surface of the channel, thus urging the L-shaped bracket rearwardly against the lips. Because, in the typical arrangement, the set screws are forced against the relatively soft aluminum frame section under considerable pressures, the aluminum tends to become pitted or marred and thus damaged. This becomes a significant disadvantage particularly when the frame is to be used repeatedly as is frequently the case with frames of the type described. One of the features of these frames is that they may be assembled and disassembled with relative ease to facilitate changing pictures desired. Once the rearward facing surface of the web becomes marred the alignment of the frame sections becomes untrue and the rigidity of the corner joints is impaired. This aggravates the not uncommon condition found in such framing devices in which the forwardly facing surfaces of the beveled ends of the frame sections may not mate properly even when the surfaces of the bracket retaining channel are unmarred.

In one aspect of the invention, to reduce the tendency of the screws to mar the channel, there is provided an L-shaped bracket 30 through which the set screws 26 are passed. The bearing plate 28 is formed from a relatively hard material such as steel and has no holes receptive to the set screws. The bearing plate is interposed in the channel interiorly of the screw bearing bracket. When the set screws are tightened, they bear directly against the plate 28 and not against the softer aluminum frame section. The relatively localized force applied by the set screws to the bearing bracket are distributed evenly across the area of the bearing bracket to the regions of the frame section 10 which are engaged by the bearing bracket. This provides a more effective grip on the framing members over a considerably greater area than had been previously achieved merely by the set screws alone. The relatively hard nature of the bearing bracket virtually eliminates the difficulties heretofore presented by applying the force of the set screws directly against the relatively soft aluminum. The frame may be assembled and disassembled any number of times without deterioration of the alignment or effective locking features of the frame.

Another aspect of the invention relates to an arrangement by which the frame sections may be forcibly pivoted inwardly toward each other about their lengths to cause the forwardly facing beveled edges to be urged tightly against each other. One embodiment of this aspect of the invention may be seen from FIG. 2 which shows the manner in which the rearwardly facing channel 14 is oriented in relation to the remaining portions of extruded frame section, particularly the forwardly extending portions 18, 20. Thus, the surfaces of the walls 22, 24a, 24b and the rearwardly facing surface of the common wall 12 are arranged so that the channel 14 may be considered as defining a slight parallelogram. The common wall 12 is tapered so that its rearwardly facing surface 12a is disposed at a slight angle from the normal to the front wall 20. Similarly, the inner lip 24a may be formed to be slightly thicker than the outer lip 24b so that a line drawn from the inner surface of one lip to the other will define the same slight angle, indicated at A. This angle need only be a fraction of a degree, for example, approximately between ⅛° to ¼°. When the frame sections are connected by the brackets and bearing plates in the manner defined above, the channel defining surface 12a and the lips 24a, 24b in adjacent abutting mitered sections will tend to align with each other and with the L-shaped brackets. The tendency toward alignment causes the sections to pivot slightly relative to the engaging legs of the bracket 30 about their general longitudinal axes thereby causing the walls 18, 20 to cant inwardly. This, in turn, brings the forwardly exposed beveled edges in the corner of the frame more closely together and avoids any tendency for a gap to appear at the corners. Because of this automatic tendency to close the corners of the frame, the manufacturing tolerances required in fabricating and cutting the frame sections may be relaxed. The invention provides an improved frame appearance, particularly in the corner regions where it is insured that the mitered ends of the frame sections are maintained in firm abutment with each other. While the use of the bearing plate is desirable, the longitudinal pivoting action of the frame members may be achieved even in its absence.

Figure 6A:
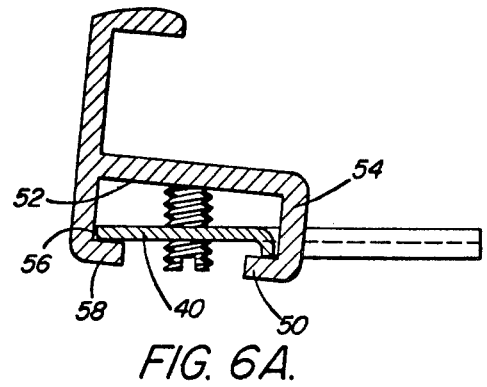
Figure 5:
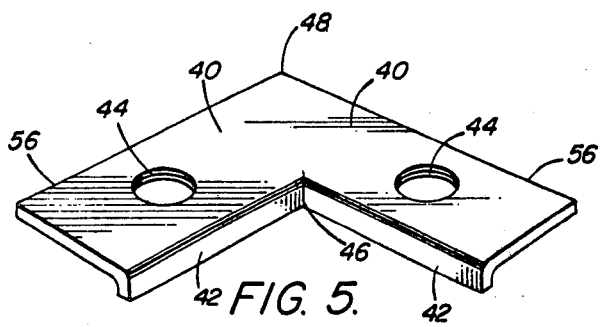
FIG. 5 is an illustration of a modified form of bracket which may be employed to effect the twisting or canting of the frame sections.
Figure 10:
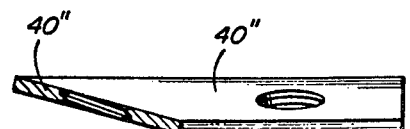
FIG. 10 is another illustration of the bracket shown in FIG. 8 as viewed along the line 10—10 of FIG. 8.
Figure 7:
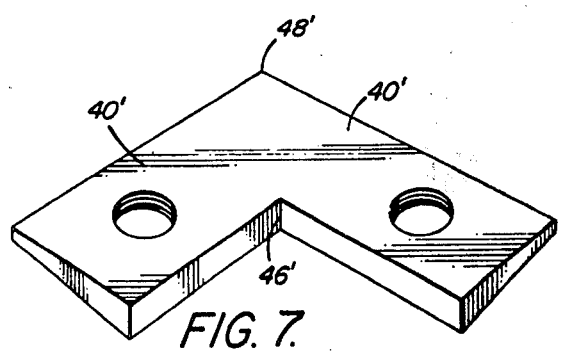
FIG. 7 shows still another embodiment of the bracket.
Figure 8:
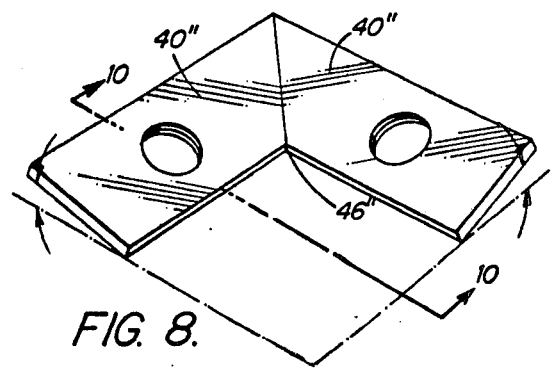
FIG. 8 shows a further embodiment of the bracket.

FIGS. 5, 7 and 8 show other embodiments of force applying brackets which may be employed to effect the twisting action of the frame sections described above. These brackets may be used with or without the bearing pads as described previously. With the embodiment shown in FIG. 5 the bracket has a pair of legs 40 each of which has a flange 42 which extends away from the general plane of the legs. Each of the legs has a threaded hole 44 formed therethrough to receive the locking screws. The bracket may be considered as defining a greater thickness along those edges of the legs which define its inside corner 46, because of the flange 42, than at its outside corner 48 which is defined only by the thickness of the sheet stock from which the bracket is made. FIGS. 6 and 6A show (exaggerated) the manner in which the bracket of FIG. 5 engages the channel formed in the frame sections to effect the pivoting motion of the frame sections when locked. The bracket is placed with its legs extending longitudinally into the channel with the flange 42 extending rearwardly and in engagement with the inside lip 50 of the channel as suggested in FIG. 6. When the locking screw is tightened it will force the bottom 52 of the channel and the leg 40 of the bracket apart which causes relative pivoting of the bracket leg and frame member about about their longitudinal axes and induces a torsional stress in the frame sections 10. When the screw has been tightened fully the outer edge 56 of the bracket engages the opposite outside lip 58 to exert a force between the rearwardly projecting wall segment 51 and the base portion 55, as shown in FIG. 6A.

FIG. 7 shows still another embodiment of the invention in which the edges of the legs 40' which meet to define the inner corner 46' of the bracket are thicker than the outer edges which meet to define the outer corner 48' of the bracket. The legs of the bracket in this embodiment define a wedge-shaped cross-section. This embodiment functions in the same manner as that shown in FIG. 5. With the legs of the bracket inserted into the channels of the adjacent frame sections tightening of the locking screws cause each of the frame sections to pivot inwardly to cause their forwardly facing beveled edges to bear firmly against each other.

FIG. 8 shows still another embodiment of the bracket in which the legs 40" of the bracket lie in planes disposed at an angle to each other.

Figure 9:
FIG. 9 is an illustration of the bracket shown in FIG. 8 as viewed from its inside corner and along the line defined by the intersecting planes of the legs of the bracket.

FIG. 9 is a view of the bracket of FIG. 8 as seen along the line of intersection of the legs 40' from the inside corner 46''. The legs 40', and more importantly, the rearwardly facing surfaces 60 thereof (which will face rearwardly when connected to the frame sections) lie in planes which intersect at an angle of more than 180°. It may be noted that this relationship is common to the embodiments shown in each of FIGS. 5-8. For example, the rearwardly facing surfaces 60' of the legs 40' of the bracket shown in FIG. 7 includes such an angular planar relationship. The embodiment shown in FIG. 5 also includes this angular relationship to the extent that the plane 62 defined by the outside edge 56 of a leg 40 and the parallel edge of the flange 42 of that leg define a plane which intersects the plane defined by the corresponding edges of the other leg 40 at an angle B of more than 180°. While the locking means for the brackets has been described as being a set screw, other means may be employed to urge the bracket legs rearwardly away from the bottom of the channel and into firm engagement with the channel lips.

Another aspect of the invention relates to an improved clip for urging the picture, mat, if any, and protective glass fully forward against the inner surface of the lip. As shown in FIG. 4 the clip 32 consists of a bowed leaf spring element formed from any number of well known resilient materials suitable for use as a leaf spring. The clip 32 is designed so that it may be inserted into the picture retaining channel with its central bowed portion 34 bearing resiliently against the rear surface of the picture 36 as suggested in FIG. 4 as to urge the picture and mat toward the inner surface of the lip 20. In order to facilitate insertion and removal of the clip when desired, the free ends of the clip are flared reversely to the central bowed portion as shown so that they may slide with relative ease along the forwardly facing surface of the central web 12. Additionally, there is formed a slot 38 in each end of the clip to enable a tool to be inserted easily therein to urge the clip out of the picture retaining channel.

Thus, described herein is an improved arrangement for assembling and retaining frame sections of the type described together and for maintaining the framed picture firmly and forwardly against the front of the frame to present the picture flat and without any bulges or wrinkles. The frame arrangement avoids difficulties heretofore presented with frames of the type described which are assembled and disassembled often to frame different pictures. It should be understood, however, that the foregoing description of the invention is intended merely to be illustrative thereof and that other embodiments and modifications may be apparent to those skilled in the art without departing from its spirit.

Having thus described the invention what is desired to be claimed and secured by Letters Patent is:

1. In a picture frame formed from frame sections, each of said frame sections having a rearwardly facing channel which terminates in inwardly extending lips, an improved means for securing an adjacent pair of said sections together at a corner junction comprising:
   a bracket having a pair of legs disposed at an angle substantially identical to the angle made by said frame sections at said corner junction, said legs being adapted to fit within the rearwardly facing channels of adjacent frame sections at said corner junction, said legs being of a width which is greater than the rearwardly facing opening defined by said lips of said rearwardly facing channels thereby to retain said bracket within said channels; and
   locking means for urging said bracket away from the bottom of said channels and toward and against said lips, said bracket and said lips of said adjacent frame sections being constructed and arranged to cause relative pivotal movement between each said frame section and the bracket leg engaged therewith along the longitudinal axes thereof in response to said urging by said locking means.

2. A device as defined in claim 1 wherein operation of said locking means produces engagement between each leg of said bracket and one of said lips of a given frame section before engagement between said bracket leg and the other lip of said given frame section.

3. A device as defined in claim 1 wherein said means for causing said relative pivotal movement between said frame section and said bracket comprises means forming the interior surfaces of said lips of said rearwardly facing channel of said at least one frame section.

4. A device as defined in claim 3 wherein each of said channel lips has a surface which faces generally forwardly, the forwardly facing surface of the inner of said channel lips being disposed closer to the forward portion of said frame section than the corresponding surface of the outer of said channel lips.

5. A device as defined in claim 4 wherein said inner channel lip is of greater thickness than said outer channel lip.

6. A device as defined in claim 1 wherein the cross-sectional shape of said frame sections comprise said rearwardly facing channel being defined by a common web, a pair of rearwardly extending walls connected to the ends of said web, each of said rearwardly extending walls terminating at its rear edge in said inwardly extending lip, a forwardly extending wall portion connected to an end of said common web and extending forwardly therefrom, the forward end of said forwardly extending wall portion terminating in an inwardly extending forward lip, said forwardly extending wall portion, common web and inwardly extending forward lip defining a picture-receiving channel.

7. A device as defined in claim 6 wherein the surfaces of said common web, rearwardly extending walls and inwardly extending lips which define said rearwardly facing channel are arranged to define a parallelogram of a configuration which is displaced approximately ⅛° to ¼° from the rectangular.

8. A device as defined in claim 1 wherein each leg of said bracket has a greater depth at its inside edge than at its outside edge so as to effect said pivotal movement.

9. A device as defined in claim 8 wherein said increased depth is defined by a flange extending away from the edge of the legs defining the inner corner of said bracket and in a direction which, when the bracket is connected to the frame sections will extend in a rearward direction.

10. A device as defined in claim 8 wherein said increased depth at the inner corner of said L-shaped bracket is formed by means comprising the legs of said L-shaped bracket being generally wedge-shaped in cross-section and being thicker at their inside corner edges than at their outside corner edges.

11. A device as defined in claim 1 wherein said locking means comprises at least one set screw threaded through each of said legs of said bracket.

12. A device as defined in claim 1 wherein said relative pivotal movement between said one frame section and said bracket induces a torsional stress in said one frame section.

13. A device as defined in claim 1 wherein each of said sections comprises an upper wall portion extending forwardly from said channel and terminating in an inwardly facing lip, said wall portion with said inwardly facing lip forming a channel for receiving an article to be framed.

14. A device as defined in claim 13 wherein the ends of said adjacent sections comprise mitered edges that are joined at said corner junctions.

15. A device as defined in claim 14 wherein said relative pivotal movement urges together the mitered edges of said inwardly facing lips on said adjacent frame sections so as to establish a forcible abutment therebetween.